(12) United States Patent
Peru

(10) Patent No.: US 10,737,727 B2
(45) Date of Patent: Aug. 11, 2020

(54) REAR STRUCTURE OF MOTOR VEHICLE COMPRISING A REINFORCEMENT FOR REAR-END COLLISIONS

(71) Applicant: PSA Automobiles SA, Poissy (FR)

(72) Inventor: Marc Peru, Chatenay-Malabry (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 16/464,783

(22) PCT Filed: Nov. 13, 2017

(86) PCT No.: PCT/FR2017/053097
§ 371 (c)(1),
(2) Date: May 29, 2019

(87) PCT Pub. No.: WO2018/109293
PCT Pub. Date: Jun. 21, 2018

(65) Prior Publication Data
US 2019/0337569 A1    Nov. 7, 2019

(30) Foreign Application Priority Data
Dec. 16, 2016   (FR) ...................................... 1662688

(51) Int. Cl.
*B62D 21/15* (2006.01)
*B62D 25/08* (2006.01)
(Continued)

(52) U.S. Cl.
CPC ............ *B62D 21/152* (2013.01); *B62D 21/11* (2013.01); *B62D 25/08* (2013.01); *B62D 25/2027* (2013.01); *B60R 7/04* (2013.01)

(58) Field of Classification Search
CPC ......... B60R 7/04; B62D 21/152; B62D 21/11; B62D 25/08; B62D 25/2027
(Continued)

(56) References Cited

U.S. PATENT DOCUMENTS 7,213,832 B2    5/2007   Hayashi
2007/0132223 A1    6/2007   Scheffzuek
(Continued)

FOREIGN PATENT DOCUMENTS

| DE | 102010019992 A1 | 11/2011 | |
| DE | 102013009761 A1 * | 12/2013 | ............. B62D 25/20 |
| DE | 102013009761 A1 | 12/2013 | |
| FR | 2914616 A1 | 10/2008 | |
| GB | 2306922 A | 5/1997 | |

OTHER PUBLICATIONS

International Search Report for corresponding PCT/FR2017/053097 dated Feb. 22, 2018.
(Continued)

*Primary Examiner* — Joseph D. Pape
*Assistant Examiner* — Dana D Ivey
(74) *Attorney, Agent, or Firm* — Sandberg Phoenix & von Gontard, P.C.

(57) ABSTRACT

The invention relates to a rear structure of a motor vehicle (201), said structure comprising: a floor having a rear area intended for accommodating a rear bench, said area being raised forming a projection (209B) relative to an area of said floor adjacent to the front; two rear structural profile members (207) extending longitudinally towards the rear under the rear area of the floor away from the projection (209B); characterised in that the structure (201) also comprises: two reinforcements (215) on the two structural profile members (207), respectively; each of said reinforcements (215) being attached to the corresponding profile member (207) and to the floor, at the projection (209B), and configured to limit a
(Continued)

tendency of said profile member (207) to pivot vertically upwards in the event of a rear impact.

10 Claims, 3 Drawing Sheets

(51) Int. Cl.
  *B62D 25/20* (2006.01)
  *B62D 21/11* (2006.01)
  *B60R 7/04* (2006.01)
(58) Field of Classification Search
  USPC .................................................. 296/187.11
  See application file for complete search history.

(56) References Cited

U.S. PATENT DOCUMENTS

| | | | |
|---|---|---|---|
| 2007/0138837 A1 | 6/2007 | Tomioka | |
| 2009/0278384 A1* | 11/2009 | Yamada | B62D 21/152 296/187.11 |
| 2013/0026786 A1 | 1/2013 | Saeki | |

OTHER PUBLICATIONS

Written Opinion for corresponding PCT/FR2017/053097 dated Feb. 22, 2018.

\* cited by examiner

REAR STRUCTURE OF MOTOR VEHICLE COMPRISING A REINFORCEMENT FOR REAR-END COLLISIONS

CROSS-REFERENCE TO RELATED APPLICATIONS

This application is the US National Stage under 35 USC § 371 of International Application No. PCT/FR2017/053097, filed 13 Nov. 2017 which claims priority to French Application No. 1662688 filed 16 Dec. 2016, both of which are incorporated herein by reference.

BACKGROUND

This invention relates to the field of motor vehicles, particularly the rear structure of motor vehicles.

FIG. 1 is a lateral and interior view of a rear structure of a prior art motor vehicle 1. This structure comprises a floor 9 that forms a projection 9B with a zone 9C adjacent to the front of the floor 9. Two rear structural profile members 7, commonly called longitudinal members, extend longitudinally toward the rear from the floor projection 9B and are positioned inside the rear wheel well 3. There are currently new protocols in place for offsetting rear shock impact on 70% of the rear part of the vehicle. In this type of impact the rear structural profile member 7 tends to move vertically (represented schematically by the dotted lines), leading to the appearance of two angular contacts 11. These angular contacts 11 correspond to fractures in the rear structural profile member 7, which lead to the profile member 7 absorbing less impact. In order to reinforce the structure of the vehicle during a rear impact, the structure of the chassis can be modified, but that requires heavy investment.

U.S. Pat. No. 7,213,873 B2 describes a front structure of a motor vehicle including two shock absorbing devices at the front of the vehicle and a reinforcement that holds the two shock absorbers together, placed behind the bumper. This reinforcement will improve the absorption of energy by the shock absorbing apparatuses.

US Pub. No. 2007/0132223 A1 outlines two shock absorbing devices placed following the two longitudinal members, which are positioned laterally on the floor. This Publication also describes an additional shock absorbing device called a crash box, which is located between the first shock absorbing device and the longitudinal members. These structures, however, have no effect on the rear structural profile member moving vertically. This improves shock absorption.

SUMMARY

An object of the invention is to reduce at least some of the inconveniences mentioned above. More specifically, the purpose of the invention is to make the rear structure of a motor vehicle better able to absorb a rear shock, particularly offsetting the rear shock recovered at 70% and to limit the verticalization of the rear structural profile member.

To this end, a rear structure of a motor vehicle is provided which comprises a floor with a rear zone meant to hold a back seat, the zone being elevated, forming a projection from the floor zone adjacent to the front part; two rear structural profile members extended longitudinally backward under the rear zone of the floor from the projection; wherein the structure comprises, amongst other things: two reinforcements on the two structural profile members, respectively; each of the reinforcements is fixed to the corresponding profile member and the floor, at the projection, and configured to limit the profile member's tendency to move vertically upwards in the event of a rear collision.

The projection is a part of the floor generally vertically oriented and commonly called the "heel board."

According to a preferred embodiment, each of the reinforcements includes a rear portion that extends longitudinally under the corresponding profile member and a front portion extending under the adjacent zone of the floor.

According to a preferred embodiment, the front portion of each reinforcement includes legs extending longitudinally from the rear portion. The legs each have at least one screw fixing eyelet.

According to a preferred embodiment, the rear portion of each reinforcement extends vertically along a lateral side of the corresponding profile member and is attached to the side.

According to a preferred embodiment, each of the reinforcements comprises a middle section located between the rear and front portions, extending vertically along the projection so that it can push on the projection in the event that the corresponding profile member pivots vertically during a rear impact.

This middle portion can be strengthened with additional tubular reinforcements.

According to a preferred embodiment, for each of the reinforcements, the rear portion comprises at the exterior lateral edge in a rear position at least one screw fixing eyelet at a structural longitudinal member lateral to the floor.

According to a preferred embodiment, the rear portion of each of the reinforcements comprises vertical walls that form cavities in contact with the corresponding profile member and that is deformable in compression during the vertical pivoting of the profile member during rear impact.

Preferably, the vertical walls are between 1- and 3-mm thick.

According to a preferable embodiment, each of the reinforcements comprises a metallic tubular structure that extends over the front and rear portions; the deformable cavities, if any, are connected to the structure.

This tubular metallic structure can be used to attach the reinforcement to the rear structure of the vehicle, particularly on the lateral structural longitudinal member, to the longitudinal profile member and to the rear structural profile member. In this case, the deformable cavities are preferably produced in a compound material like BMC (Bulk Molding Compound) and/or SMC (Sheet Molding Compound). The tubular structure is preferably in steel with a diameter between 30 and 45 mm, and between 2- and 3.5-mm thick.

According to a preferred embodiment, each reinforcement is a metallic casting part forming the front, rear, and middle piece, where there is one; and deformable cavities, if there are any. If there is one, the metallic piece can be aluminum. It can also have additional reinforcements, particularly on the external and internal lateral edges of the rear portion. Preferably, the vertical walls are between 2- and 4-mm thick, and the rear portion is between 4- and 6-mm thick.

The dimensions of the reinforcement are interesting because they make it possible to reinforce the rear structure of a vehicle without substantially increasing its weight. Finally, it prevents the rear structural profile members from moving vertically.

DESCRIPTION OF THE FIGURES

Other characteristics and advantages of this invention can be better understood using the description and drawings among which.

DETAILED DESCRIPTION

In FIGS. 2 to 6 there is shown a rear structure 101 of a motor vehicle incorporating a first embodiment of a reinforcing structure.

Figure 1:
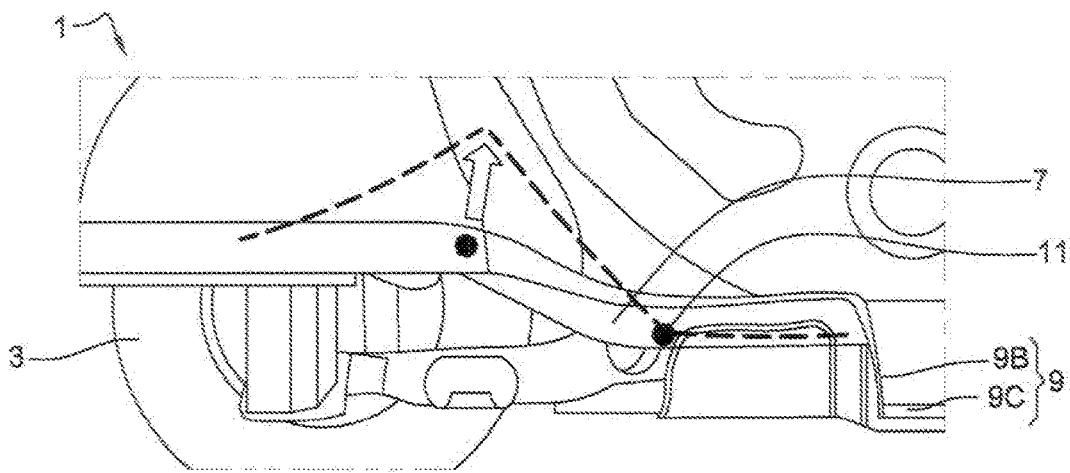
FIG. 1 is a lateral cut of a motor vehicle according to prior art.
Figure 2:
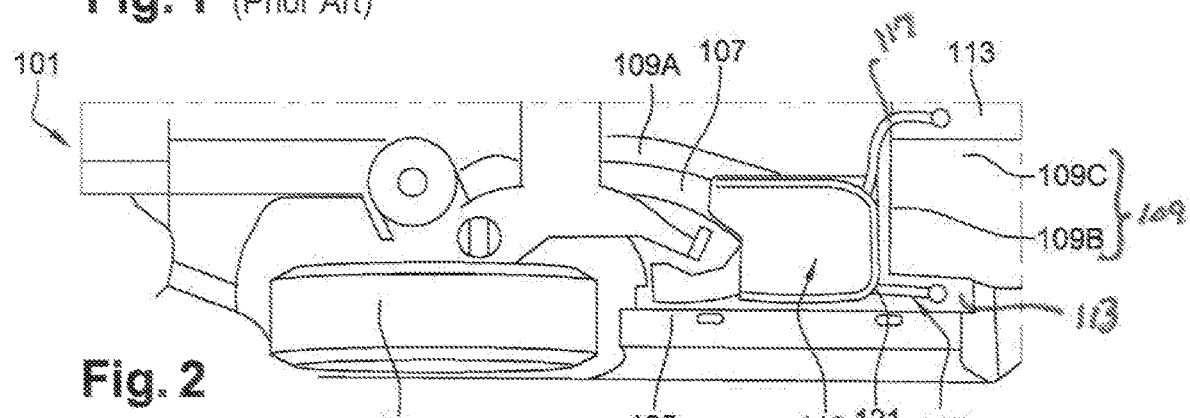
FIG. 2 is a view from below of the structure of a motor vehicle according to a first embodiment of a reinforcement structure.
Figure 3:
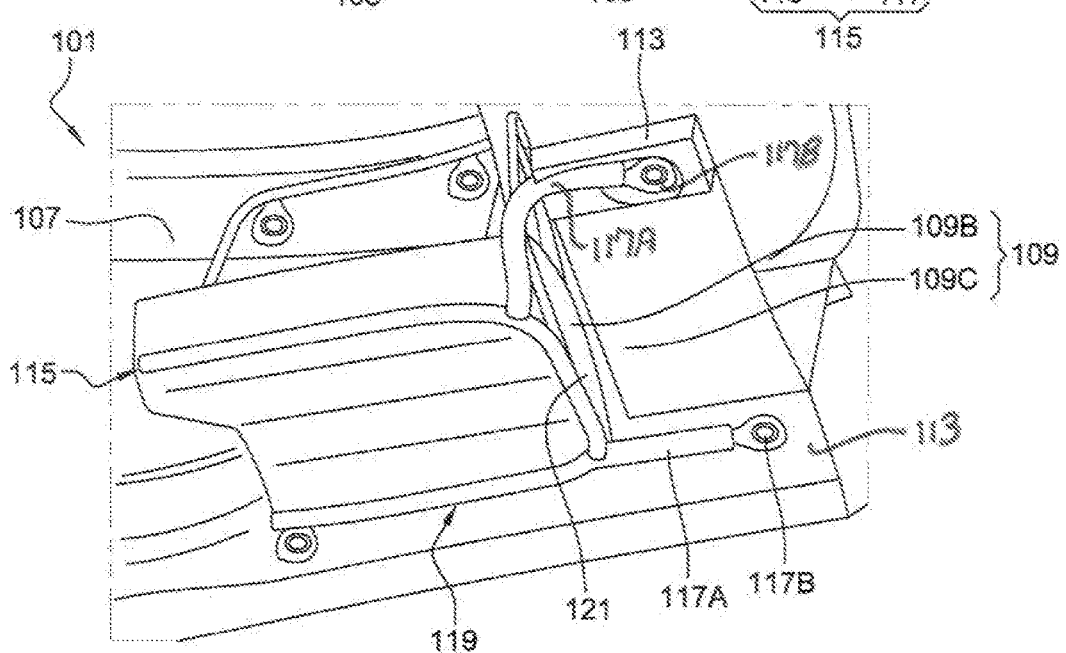
FIG. 3 is a ¾ and bottom view of the structure of FIG. 2.
Figure 4:
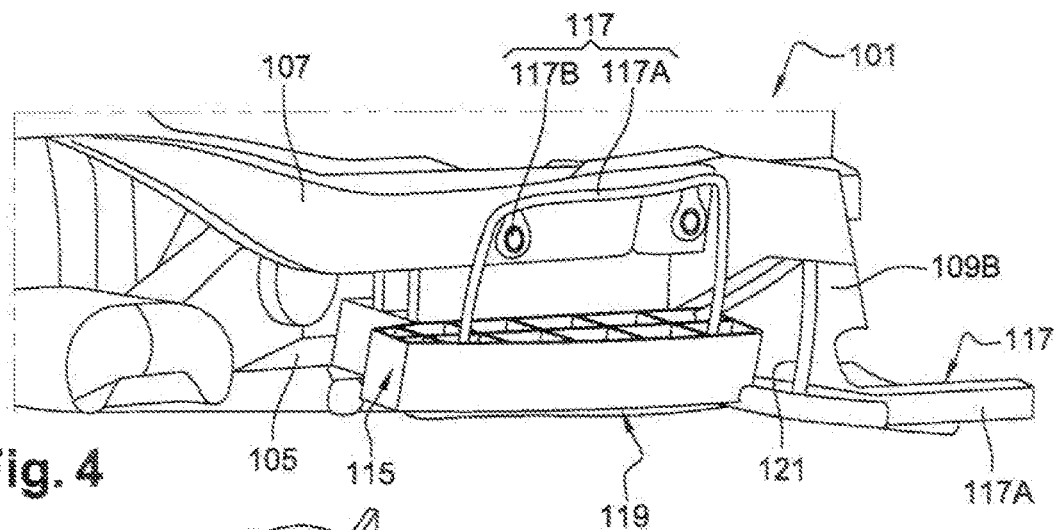
FIG. 4 is a lateral view of the structure of FIGS. 2 and 3.
Figure 5:
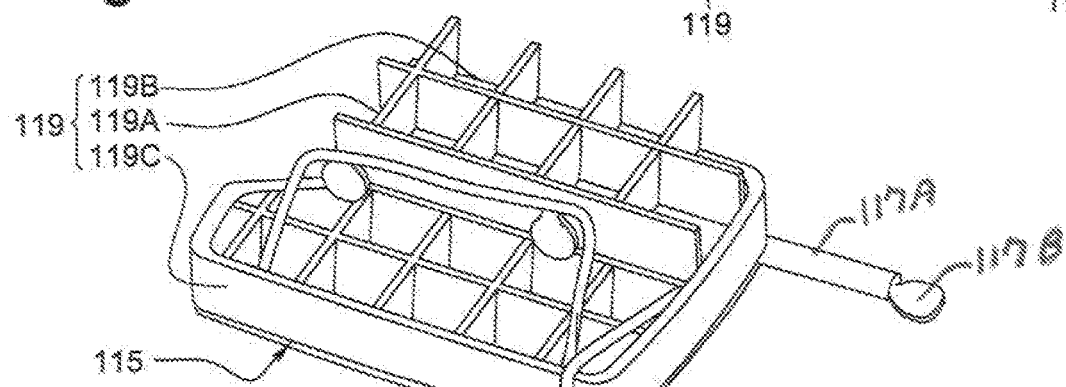
FIG. 5 is a view in perspective of the reinforcement of FIGS. 2 to 4.
Figure 6:
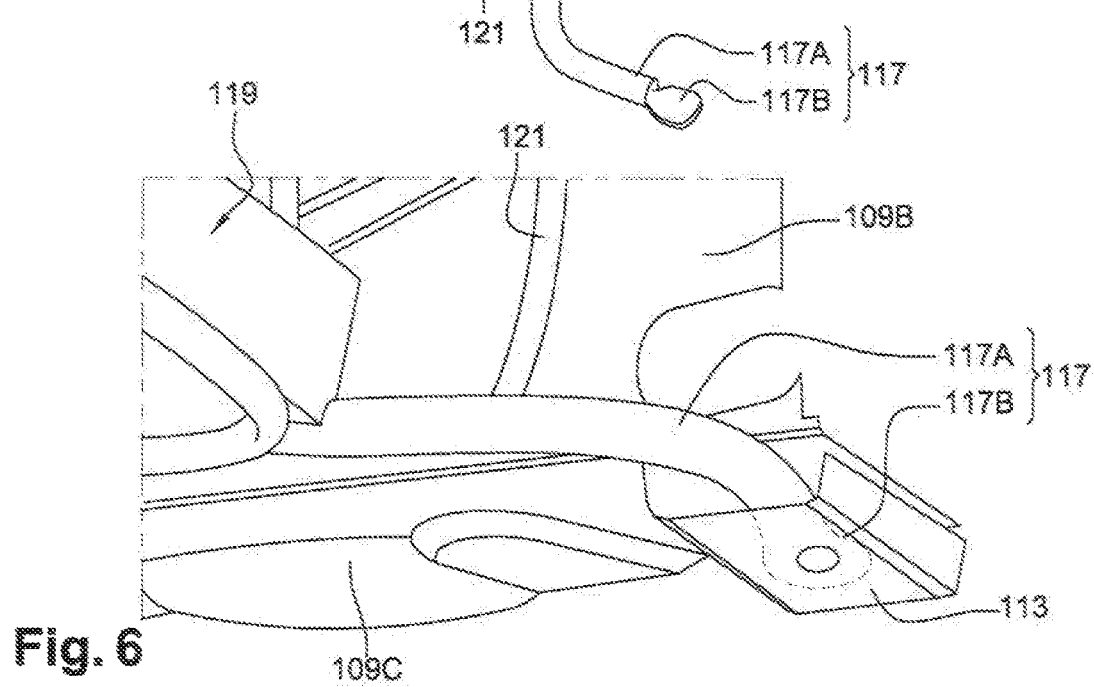
FIG. 6 is a view from below of the structure of FIGS. 2 to 5.

This structure 101 comprises a floor 109, itself comprised by a rear zone 109A and a front zone 109C, the rear zone 109A being elevated with respect to the front zone 109C and forming a projection 109B with respect to the front zone 109C. This structure 101 also comprises a lateral structural longitudinal member 105, commonly called the underseal, which extends laterally from the floor 109 of the vehicle toward the wheel well and rear wheel, and a rear structural profile member 107, commonly called the longitudinal member, which extends longitudinally from the floor projection 109B toward the rear zone of the floor. A reinforcement 115 is attached to the rear structural profile member 107 and the floor 109. This reinforcement 115 is divided into three parts: a front part 117, a rear part 119, and a middle part 121. The rear part 119 of the reinforcement 115 extends rearwardly longitudinally from the floor projection 109B. In this case, the rear part 119 of the reinforcement 115 comprises vertical walls forming cavities 119A that serve to absorb the folded cavity in compression, like a crash box. The cavities 119A are supported by a metallic reinforcing tubular structure, attached to the rear structure 101 of the vehicle. An exterior lateral edge 119B is positioned along the lateral structural longitudinal member 105, and an interior lateral edge 119C is positioned along and away from the rear structural profile member 107. The tubular structure forms the middle portion 121 which extends in front of the rear portion 119 and the reinforcement 115 and vertically along the projection 109B. Finally, the tubular structure forms the front portion 117 of the reinforcement 115. Two legs 117A come out from the rear part 119 and are attached to the two longitudinal profile members 113 positioned under the floor 109. They are screwed on through screw eyelets 117B. They can be attached to the front of these profile members either on the profile members 113 (as shown in FIGS. 2 and 3) or in the longitudinal profile members 113 (as shown in FIG. 6).

Figure 7:
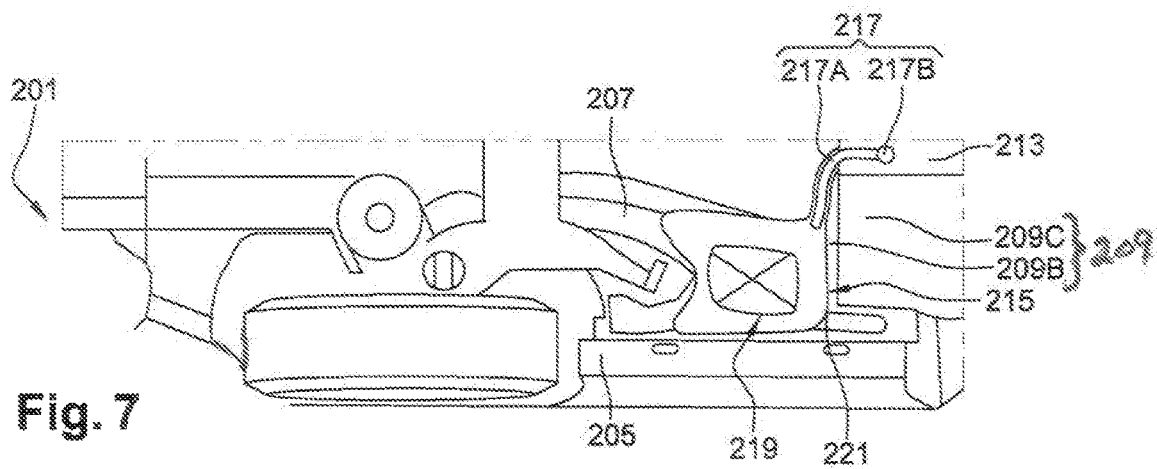
FIG. 7 is a view from below of the structure of a motor vehicle according to a second embodiment of the structure.
Figure 8:
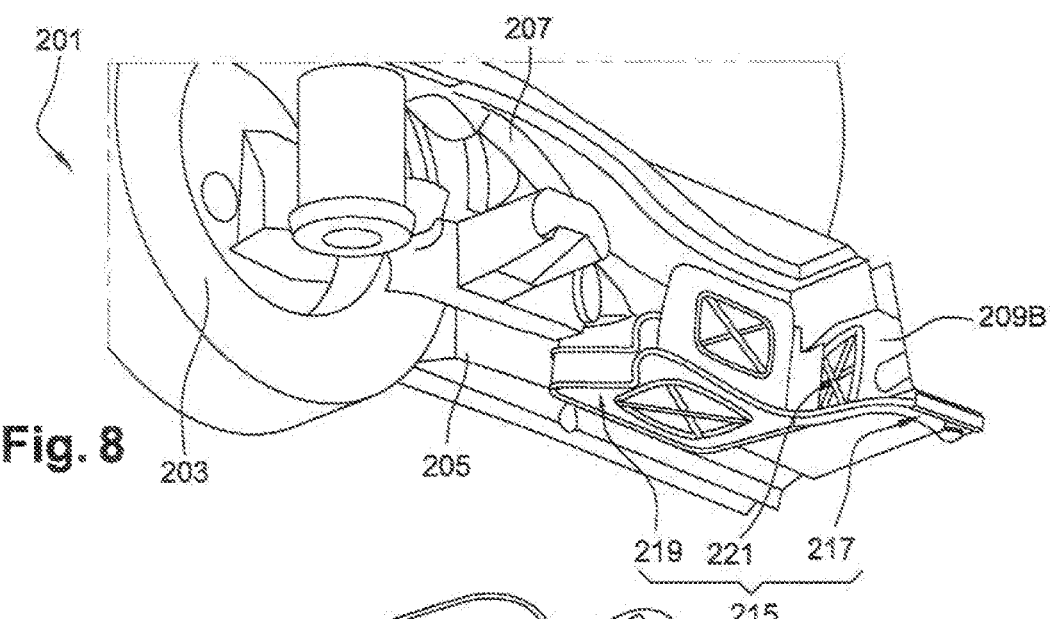
FIG. 8 is a ¾ rear view of the structure of FIG. 7.
Figure 9:
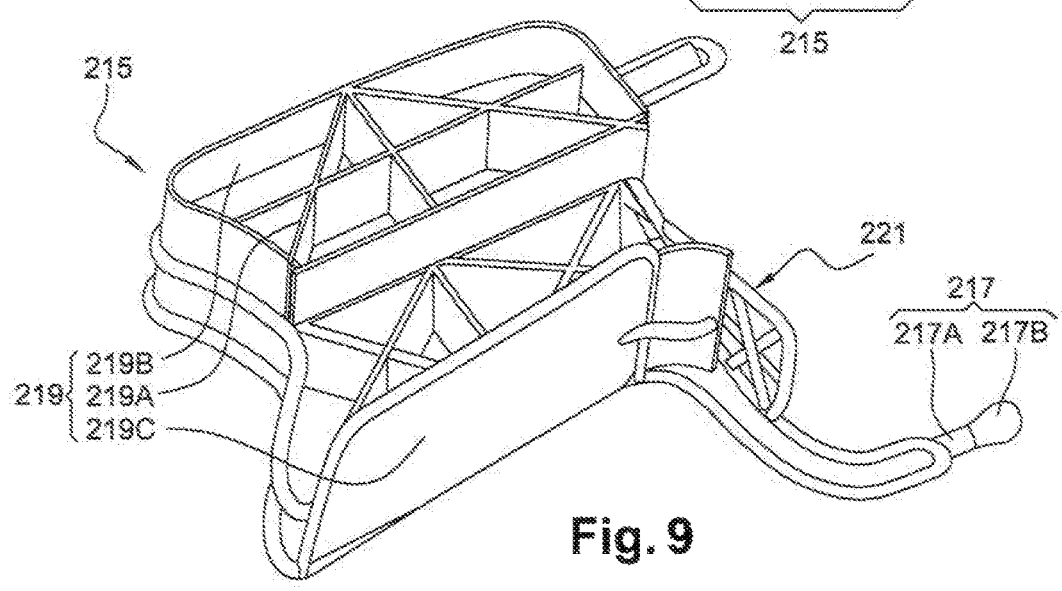
FIG. 9 represents the reinforcement of the structure of FIGS. 7 and 8.

FIGS. 7 and 9 also describe a rear structure of a motor vehicle 201 with a reinforcement 215 according to a second embodiment of the structure. These figures adopt the numbering of FIGS. 2 to 6 for the identical or similar elements, although the numbering is increased by 100. Furthermore, the description of these elements will be referred to in relation to the first embodiment. Numbers from 200 to 300 are used for elements specific to this embodiment. This reinforcement 215 presents most of the characteristics of the reinforcement 115 described in the first embodiment.

A rear portion 219 is arranged in the same way as the rear portion 119 of the reinforcement 115, which extends forwardly from a middle portion 221 of the reinforcement, and which extends vertically to form the projection 209B of the floor 209. This middle portion 221 is reinforced by the additional tubular reinforcements. Two legs 217A come out from the rear portion 219 ending by screw eyelets 217B with which the reinforcement 215 can be attached to the longitudinal profile members 213 positioned under the floor 209 of the vehicle. The reinforcement 215 in this case is designed as a single piece. Another particular feature of this reinforcement 215 is that preferably, it is made in metallic materials. The rear portion 219, according to a second embodiment of the structure, can also present additional reinforcements, particularly on the external 219B and internal 219C lateral edges.

The two embodiments of the reinforcements can be done together or separately.

The invention claimed is:

1. A rear structure of a motor vehicle, said rear structure comprising:
   a floor with a rear zone for supporting a rear seat, said rear zone being elevated to form a projection with regard to a front zone of the said floor adjacent to the front of said rear zone;
   two rear structural profile members extending longitudinally rearwardly from the projection, such that said rear structural profile members are under the rear zone of the floor; and
   two reinforcements, there being one reinforcement secured to each of the two structural profile members; each of said reinforcements being attached to the corresponding profile member and to the floor at the projection and being configured so to restrict the profile member's tendency to pivot vertically upwardly in the event of a rear impact.

2. A rear structure of a motor vehicle, the said structure comprising:
   a floor with a rear zone for supporting a rear seat, said rear zone being elevated to form a projection with regard to a zone of the said floor adjacent to the front;
   two rear structural profile members extending longitudinally toward the back under the rear zone of the floor from the projection; and
   two reinforcements on the two structural profile members respectively; each of said reinforcements being attached to the corresponding profile member and to the floor at the projection and being configured so to restrict the profile member's tendency to pivot vertically upwards in the event of a rear impact; wherein each reinforcement comprises a rear portion that extends longitudinally under the corresponding profile member and a front portion that extends under the zone adjacent to the floor.

3. The rear structure according to claim 2, wherein for each reinforcement, the front portion includes legs that extend longitudinally from a rear portion of the reinforcement; said legs each comprise at least one screw eyelet.

4. The rear structure according to claim 3, wherein at least one of the legs of the reinforcements is fixed to a longitudinal profile member that extends under the floor.

5. The rear structure according to claim 2, wherein for each reinforcement, the rear portion extends vertically along a lateral face of the corresponding profile member and is attached to said face.

6. The rear structure according to claim 2, wherein each reinforcement includes a middle portion located between the rear and front portions, extending vertically along the projection in order to build on said projection in the event that the corresponding profile member pivots vertically during a rear impact.

7. The rear structure according to claim 2, wherein for each reinforcement the rear portion includes at a rear position of the exterior lateral edge at least one screw eyelet at a structural lateral longitudinal member of the floor.

8. The rear structure according to claim 2, wherein for each of the reinforcements, the rear portion includes vertical walls forming cavities in contact with the profile member corresponding and able to deform in compression when the profile member pivots vertically during rear impact.

9. The rear structure according to claim 8, wherein each reinforcement includes a metallic tubular structure extending over the front and rear portions of the reinforcement; the deformable cavities, when necessary, being connected to said structure.

10. The rear structure according to claim 8, wherein each reinforcement is a metallic casting part forming the front portion, the rear portion, and a middle portion where there is one, as well as the deformable cavities, where necessary.

\* \* \* \* \*